United States Patent

Niedrach et al.

[15] 3,635,763
[45] Jan. 18, 1972

[54] FUEL CELL ELECTRODE

[72] Inventors: Leonard W. Niedrach; Willard T. Grubb, both of Schenectady, N.Y.

[73] Assignee: General Electric Company

[22] Filed: Dec. 26, 1967

[21] Appl. No.: 693,635

[52] U.S. Cl. ...................................136/86 D, 136/120 FC
[51] Int. Cl. ..................................H01m 27/04, H01m 13/00
[58] Field of Search .....................................136/120 FC, 86

[56] References Cited

UNITED STATES PATENTS

| 3,248,267 | 4/1966 | Langer et al. | 136/120 X |
| 3,276,976 | 10/1966 | Juliard | 136/120 X |

FOREIGN PATENTS OR APPLICATIONS

| 1,477,235 | 3/1967 | France | 136/120 |

*Primary Examiner*—Winston A. Douglas
*Assistant Examiner*—M. J. Andrews
*Attorney*—Richard R. Brainard, Paul A. Frank, Charles T. Watts, Paul R. Webb, II, Frank L. Neuhauser, Oscar B. Waddell and Melvin M. Goldenberg

[57] ABSTRACT

Fuel cell electrodes are composed of a mixture of catalytic and gas adsorbing materials which consist of a chromium-tungsten oxide and a metal dispersed on a support, the metal selected from the class consisting of noble metals and alloys of noble metals, with a current collector, and a binder bonding the materials together and to the current collector in electronically conductive relationship. An adhesive binder is employed which is not chemically attacked by the electrolyte or the reactant fluid of the cell in which the electrode is used. Such an electrode is particularly useful in a fuel cell employing a fuel containing carbon monoxide, such as reformer gas, an acid electrolyte, and under various operating conditions.

12 Claims, 4 Drawing Figures

Inventors:
Leonard W. Niedrach;
Willard T. Grubb,
by Paul R. Webb II
Their Attorney.

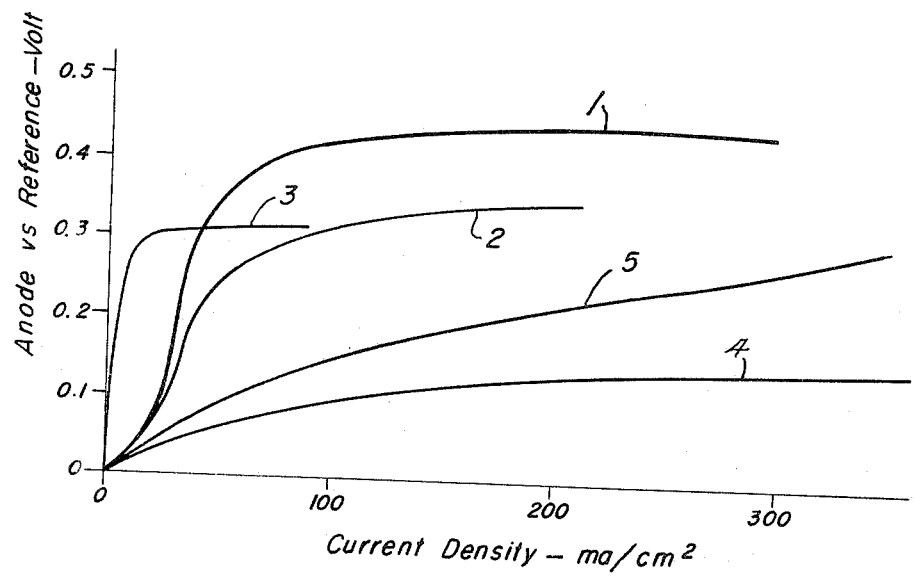
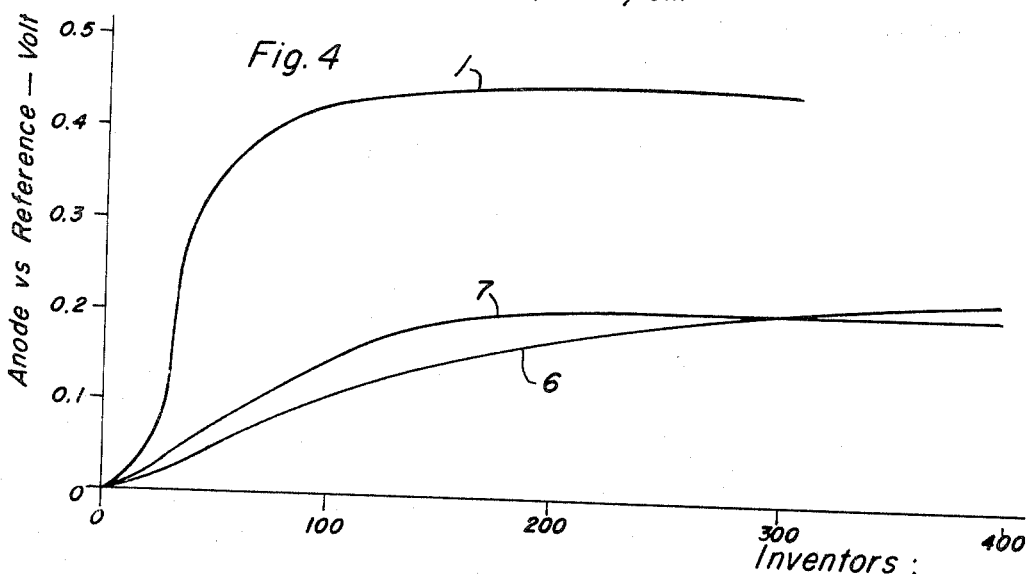

FUEL CELL ELECTRODE

This invention relates to fuel cell electrodes and, more particularly, to fuel cell electrodes comprising a mixture of catalytic and gas adsorbing materials which consist of a chromium-tungsten oxide and a metal dispersed on a support, the metal selected from the class consisting of noble metals and alloys of noble metals bonded together and bonded to a current collector in electronically conductive relationship by a binder.

As it is well known, fuel cells are devices capable of generating electricity by electrochemically combining an oxidizable reactant, termed a fuel, and a reducible reactant, termed an oxidant. The reactants are fluids, either liquids or gases, and usually fed continuously to the cell from separate external sources. The fuel cell itself is comprised of spaced electrodes ionically connected by an electrolyte. It is a characteristic of fuel cells that the electrodes and electrolytes remain substantially chemically invariant in use.

Each electrode is electronically conductive, adsorbs the fuel or oxidant employed, presents an active material for the electrode reaction, and does not oxidize unduly under the operating conditions of the cell. When fuel and oxidant are concurrently and separately supplied to the different electrodes of the fuel cell, an electrical potential will develop across the electrodes. When an electrical load is provided across the electrodes, an electrical current flows therebetween, the electrical energy thus represented being generated by the electrocatalytic oxidation of fuel at one electrode and the simultaneous electrocatalytic reduction of oxidant at the other. Suitable noble metals for catalysts are well known and many are described, for example, in "Catalysts, Inorganic and Organic," Berkman, Morrel and Egloff, Reinhold Publishing Company, New York (1940); "Catalytic Chemistry," H. W. Lohse, Chemical Publishing Company, Inc., New York (1945); etc. Suitable noble metals include the noble metals of Group VIII series of metals of the Periodic Table of Elements, which are rhodium, ruthenium, palladium, osmium, iridium, and platinum, and noble metal alloys from this group.

Since the adsorption of gases on solids is a surface phenomena, it is desirable that the catalysts be of the maximum practicable surface area and that the surface of the catalyst material preferably be in its most active state for the adsorption of gases. Thus, the extent and character of the surface presented by such catalytic material in a fuel cell electrode is an important factor in the securing of superior electrode performance. It is, of course, possible to insure an extensive catalytically active surface in a fuel cell electrode by utilizing large quantities of catalytically active material. However, the most highly catalytically active materials are expensive, accordingly, these catalytic materials should be utilized in as efficient manner as possible. The most efficient utilization of catalyst is achieved by distributing the catalytic materials so that the greatest amount of surface area may be secured per unit weight of the catalyst material.

In a copending patent application entitled "Fuel Cell Electrode" of Leonard W. Niedrach filed concurrently herewith, there is disclosed and claimed a fuel cell electrode comprising a mixture of catalytic and gas adsorbing materials of a chromium-tungsten oxide and a metal selected from the class consisting of noble metals and alloys of noble metals bonded together and bonded to a current collector in electronically conductive relationship by a binder. This copending patent application is assigned to the same assignee as the present application.

Our present invention is directed to an improved fuel cell electrode which comprises a mixture of catalytic and gas adsorbing materials which consist of a chromium-tungsten oxide and a metal dispersed on a support, the metal selected from the class consisting of noble metals and alloys of noble metals, bonded together and bonded to a current collector in electronically conductive relationship by a binder. Such an electrode is particularly useful in a fuel cell employing a fuel containing carbon monoxide, such as reformer gas, an acid electrolyte, and under various operating conditions.

It is a primary object of our invention to provide an improved electrode with a low loading of a noble catalyst which is tolerant to carbon monoxide and maintains the required catalytic characteristics.

It is another object of our invention to provide such an electrode incorporating a support material thereby securing efficient utilization of the catalyst.

It is a further object of our invention to provide a fuel cell which employs such an electrode as the anode therein and which operates on a fuel containing carbon monoxide.

In accordance with our invention, an electrode comprises a mixture of catalytic and gas adsorbing materials which consist of a chromium-tungsten oxide and a metal dispersed on a support, the metal selected from the class consisting of noble metals and alloys of noble metals, with a current collector, and a binder bonding the materials together and to the current collector in electronically conductive relationship.

These and various other objects, features and advantages of the invention will be better understood from the following description taken in connection with the accompanying drawing in which:

FIGS. 3 and 4 are plots showing the performance in a fuel cell with a fuel containing carbon monoxide of various fuel cell electrodes embodying our invention.

Figure 1:
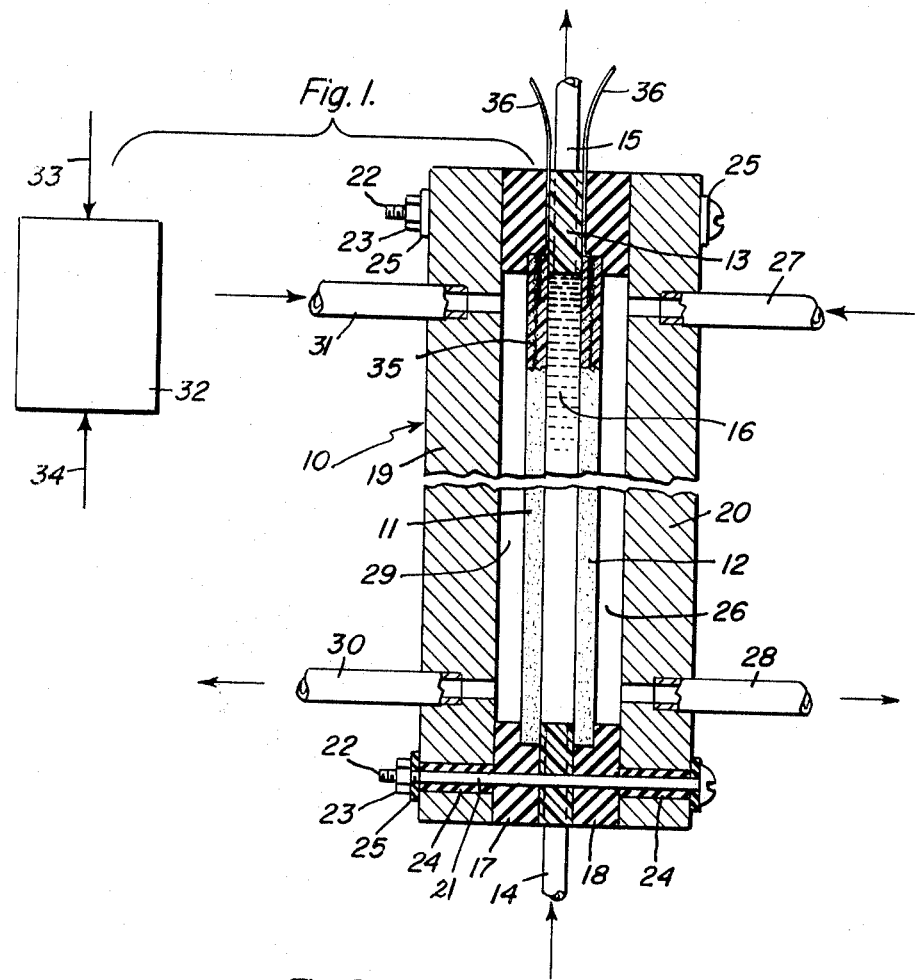
FIG. 1 is a sectional view of a fuel cell made in accordance with our invention.

In FIG. 1 of the drawing, there is shown generally at 10 a fuel cell embodying our invention which comprises a preferred anode 11 and a cathode 12, separated by an annular electrolyte gasket 13. Electrolyte inlet conduit 14 and electrolyte outlet conduit 15 are sealingly related to the electrolyte gasket to circulate a free aqueous electrolyte to and from electrolyte chamber 16 formed by the anode, cathode and gasket. An anode gasket 17 and a cathode gasket 18 are positioned adjacent opposite faces of the electrolyte gasket to seal therewith and to hold the anode and cathode in assembled relation. Identical end plates 19 and 20 are associated with the anode and cathode gaskets, respectively, in sealing relation therewith. To hold the gaskets and end plates in assembled relation, a plurality of tie bolts 21 are provided, each having a threaded end 22 and a nut 23 mounted thereon. To insure against any possibility of internal short circuiting of the fuel cell electrodes, the tie bolts are provided with insulative bushings 24 within each end plate and with an insulative washer 25 adjacent each terminus.

An oxidant chamber 26 is formed by the cathode gasket, cathode, and end plate 20. An oxidant inlet conduit 27 is sealingly associated with the end plate to allow oxidant to be fed to the oxidant chamber while an oxidant outlet conduit 28 is similarly associated with the end plate to allow the purge of oxidant. Where the fuel cell is to be operated on ambient air, no end plate 20 is required. The anode, anode gasket, and end plate 19 similarly cooperate to form a fuel chamber 29. A fuel outlet conduit 30, similar to oxidant outlet conduit 28, is provided. A fuel inlet conduit 31 is shown for providing a fuel to the fuel chamber from a fuel source 32, schematically shown. Where the fuel source is a synthetic reformer gas, a hydrocarbon or oxidized derivatives thereof would be supplied to source 32, as indicated by flow arrow 33, while water would be supplied to source 32, as indicated by flow arrow 34.

Figure 2:
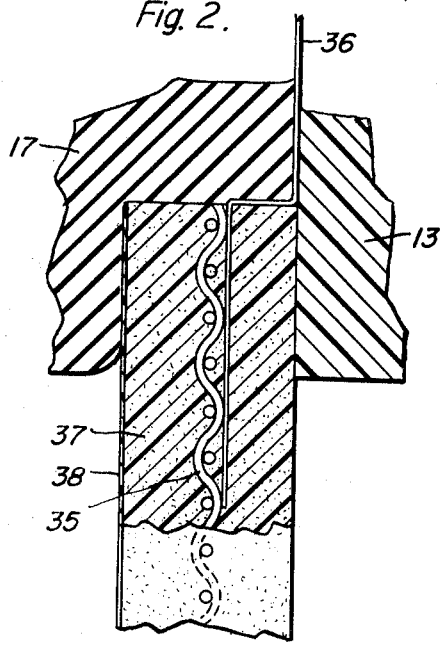
FIG. 2 is an enlarged sectional view of a fuel cell electrode made in accordance with our invention.

In FIG. 2 of the drawing there is shown generally a preferred fuel cell electrode anode 11 embodying our invention which has a current collector in the form of a metal wire screen 35 which serves the functions of transmitting electrical current and providing reinforcement for the electrode. An electrical connection in the form of an electrical lead 36 is connected directly to screen 35. Lead 36 passes to the outside of fuel cell 10 as shown in FIG. 1 at the interface of gasket 17 and gasket 13, which elements form part of the fuel cell housing. Electrode 11 has a mixture of catalytic and gas adsorbing materials 37 which consists of a chromium-tungsten oxide and a noble metal or an alloy of a noble metal dispersed on a support, for example, of carbon, bonded together by a binder and bonded to the current collector in electronically conductive relationship. For example, a mixture of a chromium-tungsten oxide and platinum dispersed on carbon particles are held together and bonded to screen 35 by a binder material of polytetrafluoroethylene. This mixture 37 surrounds both the screen 35 and a portion of electrical lead 36. If desired, a hydrophobic film 38 is shown bonded to one surface of mixture 37 to prevent electrolyte flow through electrode 11. This film is desirable if the electrode is to be used with a free aqueous electrolyte.

The preferred electrolyte for use in a fuel cell employing the above electrode is sulfuric acid, $H_2SO_4$. Additionally, other acid electrolytes may be employed which are suitable for fuel cell operation. Such acid electrolytes include, for example, $H_3PO_4$, $HClO_4$, aryl and alkyl sulfonic acids, etc. The above electrode may be used in combination with an ion exchange membrane, a porous matrix for immobilizing an aqueous electrolyte, or a free aqueous electrolyte.

As it is well known, fuel cells, which operate on hydrogen, generally produce markedly reduced electrical output when the fuel is contaminated with carbon monoxide. The reason for such decreased performance has been recognized as attributable to carbon monoxide poisoning of the electrocatalyst incorporated in the anode.

Where the fuel contains a substantial carbon monoxide content it has been common practice to protect the fuel cell against electrocatalyst poisoning by removing carbon monoxide before delivery to the fuel cell. In the case of reformer gas, for example, which is a mixture of hydrogen, carbon monoxide, water vapor, carbon dioxide, and hydrocarbons, usually present quantitatively in that order, the carbon monoxide can be removed either by conversion to carbon dioxide or methane before the gas is supplied to the fuel cell.

Alternately, the hydrogen can be purified by passage through a silver-palladium membrane. Thus, while platinoid metals have been frequently categorically designated as fuel electrocatalysts, it is apparent that use has been generally restricted to the electrocatalysis of reactants free from carbon monoxide contamination.

We discovered unexpectedly that the electrode of our invention, which has a low loading of a noble metal dispersed on a support material, operates effectively as an anode in a fuel cell employing a fuel containing carbon monoxide, such as synthetic reformer gas. Thus, the combination of the chromium-tungsten oxide and a noble metal or an alloy of a noble metal dispersed on a support in our electrode makes the electrode carbon monoxide tolerant and in fact promotes the oxidation of the fuel. Of a wide variety of noble metals, which were discussed above, we prefer to employ platinum metal or an alloy of platinum-ruthenium.

While many suitable support materials are available, we prefer to employ support materials of carbon with boron dissolved therein, a mixture of carbon with boron dissolved therein and boron carbide, or carbon particles, particularly in the graphitic state. In this application, the term "carbon and boron" will be used to describe together both of the above support materials of carbon with boron dissolved therein, and carbon with boron dissolved therein and boron carbide. When only one of the support materials is discussed, its specific name will be employed.

A wide series of chromium-tungsten oxides are suitable for mixing with a noble metal or an alloy of a noble metal, which has been dispersed on a support, to form a catalytic and gas adsorbing material mixture for our electrode. Such a series includes a range of 0.1 to 1.65 $Cr_2O_3$ per $WO_x$, where $x$ is in a preferred range of 1.5 to 2.5. While some decrease in activity is noted as the chromia content is increased, the superior corrosion resistance of the high-chromia oxides is quite advantageous.

Thus, we prefer to employ a range of 0.8 to 1.0 $Cr_2O_3$ per $WO_x$. This oxide may be mixed with the noble metal in a wide range of proportions. However, a preferred range is 30 to 70 weight percent chromium-tungsten oxide to the total weight of the support, noble metal and oxide.

The current collector which requires material of good electrical conductivity can be provided in various configurations such as screens, metal wires, punched metal plate, expanded metal plate, porous metal sheet, etc. A wide variety of materials can be employed including platinum, gold, tantalum, and various nonnoble metals coated with platinum or gold. Any suitable manner is used to bond the material mixture to the collector to form an electrode.

The binder may be any adhesive material that is not chemically attacked by the electrolyte or the reactant fluids of the cell in which the electrode is to be used. Various binders meeting this criteria are known to the art. Preferred binders are hydrophobic halocarbons, most preferably fluorocarbon binders, having a critical surface tension less than the surface tension of water. A preferred maximum critical surface tension is 32 dynes/cm. Critical surface tension is defined as the value of the liquid surface tension at which liquids spread on a given polymer surface. A full discussion of OF critical surface tension is provided at page 240, "Surface Chemistry Theory and Industrial Application" by Lloyd I. Osipow, Reinhold Publishing Corporation, New York, 1962.

Perfluorinated polymers such as polytetrafluoroethylene (PTFE) and polyhexafluoropropylene possess the highest degree of hydrophobicity and chemical stability of presently known binders and are accordingly preferred. "Teflon30" is a trademarked name of a commercially available aqueous emulsion of polytetrafluoroethylene including a wetting agent and which is suitable as a binder for our electrode.

When we employ carbon and boron as the support material, the ratio of such a binder to the total weight of the electrode excluding any current collector and waterproofing film may be from about 4 to 25 percent by weight. When carbon is employed, the ratio of such a binder calculated in the above manner is from about 15 to 30 percent by weight. Amount of binder will vary within and outside the above ranges with different support materials and methods of fabrication.

One general method for preparing a fuel cell electrode anode as shown in FIGS. 1 and 2 of the drawing is as follows. A precipitation method is employed to produce the chromium-tungsten oxide resulting in highly dispersed material. The hydroxide of chromium is precipitated from a solution of its chloride with ammonium hydroxide. This precipitate is wet-blended with tungstic acid, $H_2WO_4$, having a surface area of about 12/cm.$^2$ per gram. After air drying at 150° C., the mass is reduced at 600° to 800° C. in flowing hydrogen for a period of 4 hours. Other reducing gas mixtures are also useable, such as carbon monoxide, hydrogen-steam and carbon monoxide-carbon dioxide. After cooling in argon, the material is ready for use.

A noble metal or an alloy of a noble metal is dispersed on a support of carbon and boron. For example, a solution is prepared containing platinum "P" salt, $Pt(NH_3)_2(NO_2)_2$ in nitric acid and water. This solution is added to and mixed with carbon and boron or carbon powder to form a paste which is dried subsequently at 105° C. on a hot plate for 1 hour. An additional hour of drying is also employed by heating the paste at 150° C. in an oven. The resulting powder is carbon and boron or carbon with platinum dispersed thereon. The same procedure is followed when it is desired to disperse an alloy of a noble metal, such as platinum-ruthenium, on a carbon and boron or carbon support. A suitable ruthenium salt, such as ruthenium nitrate, is added to the above described solution. It is also preferred to avoid halogen containing salts.

A paint is prepared in a dish with a mixture of cromium-tungsten oxide and a noble metal or an alloy of a noble metal dispersed on a carbon and boron or carbon support in an aqueous suspension of polytetrafluoroethylene (PTFE). This paint is then applied onto a clean 45-mesh platinum screen with a brush until the paint is used completely. After each coating on the platinum screen, the coat is cured over a hot plate at 225° C. and then the electrode is allowed to cool before the next coat is applied. After the final paint coat has been applied, cured and cooled, an additional half-hour cure over the hot plate is employed followed by the spraying thereof of a PTFE film on one surface thereof. The electrode is then given a final 10 minute cure at 350° C. to sinter the PTFE and to decompose the platinum "P" salt further. A plurality of these electrodes are prepared.

An illustrative operation of the above electrodes comprises the employment of the above electrodes as anodes in fuel cells with a platinum black electrode bonded with PTFE, employed as the cathode. The cathode was prepared as follows: An aqueous suspension containing 59.6 percent by weight PTFE is diluted with 7 volumes of water. An aluminum foil is used as the casting surface on which is scribed the ultimately desired pattern of the electrodes. The aluminum foil is placed on a hot plate maintained at 120°–150° C. to facilitate evaporation of the water as the PTFE emulsion is sprayed onto it, using an air brush. The desired amount of spray per unit area is evenly distributed over the surface at a rate such that wet areas do not accumulate and run. After the desired amount of emulsion has been sprayed onto the casting surface, it is heated at 350° C. to volatilize the emulsifying agent and to sinter the PTFE particles into a coherent film. A mixture of platinum black and PTFE emulsion is then prepared and diluted with sufficient water to give a thin slurry, which can be conveniently spread over the PTFE film on the casting surface to cover the scribed area showing the pattern of the desired electrode. When a uniform coating is achieved, the water is slowly evaporated from the emulsion on a hot plate whose bed temperature is slowly increased to a final value of 250°–350° C. to dispel the emulsifying agent.

To incorporate the current collector in the electrode, a similar procedure is used to form a second PTFE-platinum black powder directly on another casting surface without an underlying PTFE film. The current collector, a 45-mesh platinum screen, is cut to the desired shape and is centered over the electrode pattern on one of the two casting surfaces and the other casting surface is then centered on top of the current collector. This assembly is pressed at 350° C. for 10 minutes at a pressure of about 2,000 lbs./sq. inch of electrode surface.

Following pressing, the aluminum foil casting surfaces are dissolved from the electrodes in 20 percent aqueous sodium hydroxide and the electrode structures are rinsed with water and dried. By this technique, cathode electrodes are produced in which the current collector is sintered in the PTFE-platinum black and the electrode is coated on one side with a pure film of PTFE, to be placed facing the gaseous fuel in the cell. The electrode has a platinum loading of 34 mg./cm.$^2$.

Each cell was operated with oxygen gas supplied to the cathode and fuel containing carbon monoxide supplied to the anode. The hydrophobic film surfaces of the anode and the cathode faced the fuel gas stream and the oxygen gas stream, respectively. A 5 normal sulfuric acid solution was used as the electrolyte and the cell was operated at a temperature of 85° C. This cell operated quite satisfactorily with the fuel containing carbon monoxide and its operation will be discussed further below in connection with the subsequent figures of the drawing.

Examples of fuel cell electrodes and fuel cells employing such electrodes made in accordance with our invention are set forth below:

EXAMPLES 1–7

The details as to the composition of seven fuel cell electrodes are set forth below in table I. Example 1 was made in accordance with the previous description for the cathode containing only a platinum black catalyst. Examples 2, 4, 6 and 7 have the noble metal dispersed on a support identified as support. In these examples, the specific support material is a mixture of carbon with boron dissolved therein and boron carbide. Examples 2–3 were made in accordance with FIGS. 1 and 2 of the drawing. Examples 4–7 were made in accordance with our invention as set forth above and as shown in FIGS. 1 and 2 of the drawing.

Each of the electrodes had a PTFE film of 1.6 milligrams per square centimeter on one surface which was the gas side when the electrode was employed in a fuel cell.

TABLE I

| Example No. | Wt. of Noble Metal mg./cm.$^2$ | Form of Noble Metal | Combined Wt. of Noble Metal and Support mg./cm.$^2$ |
| --- | --- | --- | --- |
| 1 | 34 | Platinum Black | 34 |
| 2 | 5 | 28.7 wt.% Pt on Support*** | 23* |
| 3 | 5 | 25 wt.% on Graphite | 26** |
| 4 | 5 | 28.7 wt.% Pt on Support*** | 17 |
| 5 | 5 | 25 wt.% Pt on Graphite | 20 |
| 6 | 2.8 | 16.7 wt.% (Pt-30% Ru) on Support*** | 17 |
| 7 | 2.8 | 16.7 wt% (Pt-30% Ru) on Support*** | 17 |

| Example No. | Weight of Oxide mg./cm.$^2$ | Form of Oxide | Wt. of PTFE Binder mg./cm.$^2$ |
| --- | --- | --- | --- |
| 1 | none | — | 3 |
| 2 | none | — | 5 |
| 3 | none | — | 5 |
| 4 | 17 | 0.1 $Cr_2O_3 \cdot WO_x$ | 5 |
| 5 | 20 | 0.1 $Cr_2O_3 \cdot WO_x$ | 5 |
| 6 | 17 | 0.1 $Cr_2O_3 \cdot WO_x$ | 5 |
| 7 | 17 | $Cr_2O_3 \cdot WO_x$ | 5 |

* Includes unactivated carbon with boron dissolved therein and boron carbide added to the extent of 6 mg./cm.$^2$ to increase bulk of electrode structure.

** Includes unactivated graphite added to the extent of 6 mg./cm.$^2$ to increase bulk of electrode structure.

*** In examples, 2, 4, 6 and 7, the supports were chromium-tungsten oxide, and a mixture of carbon with boron dissolved therein and boron carbide.

EXAMPLES 8–12

Each of the electrodes from examples 1–5 was employed as the anode in a fuel cell with an electrolyte of 5 normal $H_2SO_4$, and a cathode of platinum bonded with PTFE onto a current collector made in the same manner as the electrode of example 1. Each cathode had a platinum loading of 34 mg./cm.$^2$. A hydrophobic film of 1.6 milligrams of PTFE per square centimeter was provided on the gas side of each cathode and each anode and a fuel gas with a composition of 78% $H_2$, 2.0% CO, 20% $CO_2$ and 0.25% $CH_4$ was supplied to the anode. Oxygen was supplied to the cathode. The cell was operated at 85° C.

The effect of our electrode as set forth above in examples 4 and 5 are compared with the electrode set forth in example 1 which contained only platinum and with the electrodes of examples 2 and 3 which did not contain oxide. This comparison is shown in FIG. 3 of the drawing wherein the current density in milliamperes per square centimeter is plotted against anode versus reference in volts. The curves represent anode polarization as a function of current density. The lower values therefor represent better performance, and lead to higher voltages between terminals of complete fuel cells. Curves 1–5 show the performance of the five fuel cells as described above which employed anode electrodes 1–5, respectively, from examples 1–5. FIG. 3 demonstrates clearly the superior performance of the anode electrodes of our invention over the performance of the anode containing only platinum or containing support material without a chromium-tungsten addition.

EXAMPLES 13-15

Each of the electrodes from examples 1, 6 and 7, was employed as the anode in a fuel cell with an electrolyte of 5 normal $H_2SO_4$, and a cathode of platinum bonded with PTFE onto a current collector made in the same manner as the electrode of example 1. Each cathode had a platinum loading of 34 mg./cm.$^2$. A hydrophobic film of 1.6 milligrams of PTFE per square centimeter was provided on the gas side of each cathode and each anode and a fuel gas with a composition of 78% $H_2$, 2.0% CO, 20% $CO_2$ and 0.25% $CH_4$ was supplied to the anode. Oxygen was supplied to the cathode. The cell was operated at 85° C.

The effect of our electrodes as set forth above in examples 6 and 7 are compared with the electrode set forth in example 1 which contained only platinum. This comparison is shown in FIG. 4 of the drawing wherein the current density in milliamperes per square centimeter is plotted against anode versus reference in volts. The curves represent anode polarization as a function of current density. The lower values therefor represent better performance, and lead to higher voltages between terminals of complete fuel cells. Curves 1, 6 and 7 show the performance of the three fuel cells as described above which employed anode electrodes 1, 6 and 7, respectively, from examples 1, 6 and 7. FIG. 4 demonstrates clearly the superior performance of the anode containing only platinum.

While other modifications of the invention and variations thereof which may be employed within the scope of this invention have not been described, the invention is intended to include such as may be embraced within the following claims.

What we claim as new and desire to secure by U.S. Letters Patent is:

1. An electrode comprising catalytic and gas adsorbing materials, a current collector, and a binder bonding the materials together and to the current collector in electronically conductive relationship, said catalytic and gas adsorbing materials comprising a mixed oxide of chromium and tungsten and a metal dispersed on a support and a metal selected from the class consisting of noble metals and alloys of noble metals.

2. An electrode as in claim 1, in which the metal is platinum.

3. An electrode as in claim 1, in which the metal is a platinum-ruthenium alloy.

4. An electrode as in claim 1, in which the binder is polytetrafluoroethylene.

5. An electrode as in claim 1, in which the support is a mixture of carbon with boron dissolved therein and boron carbide.

6. An electrode as in claim 1, in which the support is carbon.

7. A fuel cell comprising a cathode electrode, an oxidant supply for the cathode electrode, an acid electrolyte, a fuel containing carbon monoxide, and an anode electrode comprising catalytic and gas adsorbing materials, a current collector, and a binder bonding the materials together and to the current collector in electronically conductive relationship, said catalytic and gas adsorbing materials comprising a mixed oxide of chromium and tungsten and a metal dispersed on a support, the metal selected from the class consisting of noble metals and alloys of noble metals.

8. A fuel cell as in claim 7, in which the metal is platinum.

9. A fuel cell as in claim 7, in which the metal is a platinum-ruthenium alloy.

10. A fuel cell as in claim 7, in which the binder is polytetrafluoroethylene.

11. A fuel cell as in claim 7, in which the support is a mixture of carbon with boron dissolved therein and boron carbide.

12. A fuel cell as in claim 7, in which the support is carbon.

* * * * *